US011952240B2

(12) United States Patent
Dold et al.

(10) Patent No.: US 11,952,240 B2
(45) Date of Patent: Apr. 9, 2024

(54) ELEVATOR ROLLER FOR AN ELEVATOR SYSTEM, ELEVATOR SYSTEM HAVING AT LEAST ONE SUCH ELEVATOR ROLLER, AND METHOD FOR PRODUCING AN ELEVATOR ROLLER

(71) Applicant: Inventio AG, Hergiswil (CH)

(72) Inventors: Florian Dold, Cham (CH); Gian-Reto Petruzzi, Lucerne (CH); Volker Zapf, Kriens-Obernau (CH)

(73) Assignee: INVENTIO AG, Hergiswil (CH)

( * ) Notice: Subject to any disclaimer, the term of this patent is extended or adjusted under 35 U.S.C. 154(b) by 94 days.

(21) Appl. No.: 17/595,146

(22) PCT Filed: May 15, 2020

(86) PCT No.: PCT/EP2020/063661
§ 371 (c)(1),
(2) Date: Nov. 10, 2021

(87) PCT Pub. No.: WO2020/234172
PCT Pub. Date: Nov. 26, 2020

(65) Prior Publication Data
US 2022/0219944 A1 Jul. 14, 2022

(30) Foreign Application Priority Data
May 17, 2019 (EP) .................................... 19175138

(51) Int. Cl.
*B66B 15/02* (2006.01)

(52) U.S. Cl.
CPC .................................. *B66B 15/02* (2013.01)

(58) Field of Classification Search
CPC ..................................................... B66B 15/04
See application file for complete search history.

(56) References Cited

U.S. PATENT DOCUMENTS

| | | | | |
|---|---|---|---|---|
| 8,348,019 | B2 * | 1/2013 | Blochle .................. | B66B 15/04 474/190 |
| 2017/0267497 | A1 | 9/2017 | Ma et al. | |

FOREIGN PATENT DOCUMENTS

| | | | |
|---|---|---|---|
| CN | 1059939 | A | 4/1992 |
| CN | 1589230 | A | 3/2005 |
| CN | 2908444 | Y | 6/2007 |
| CN | 102282088 | A | 12/2011 |
| CN | 106573761 | A | 4/2017 |

(Continued)

OTHER PUBLICATIONS

Machine Translation of CN 108715388.*
(Continued)

*Primary Examiner* — Diem M Tran
(74) *Attorney, Agent, or Firm* — William J. Clemens; Shumaker, Loop & Kendrick, LLP

(57) ABSTRACT

A roller for an elevator system has a roller body made of a metal material and a shell made of a POM material forming a running surface of the elevator roller. The shell and the roller body each have a wave profile running in a circumferential direction on a shared contact surface, wherein the shell has, on the running surface, a V-ribbed profile aligned with the wave profile of the roller body that has a rib spacing which substantially corresponds to a wave spacing of the wave profile. The elevator roller is manufactured using a molding process.

16 Claims, 3 Drawing Sheets

(56) References Cited

FOREIGN PATENT DOCUMENTS

| | | | | |
|---|---|---|---|---|
| CN | 108715388 | A | * | 10/2018 |
| CN | 108883902 | A | | 11/2018 |
| EP | 2684831 | A1 | | 1/2014 |
| EP | 3025998 | A1 | | 6/2016 |
| WO | 2013172824 | A1 | | 11/2013 |
| WO | 2016019135 | A1 | | 2/2016 |
| WO | 2017140635 | A1 | | 8/2017 |

OTHER PUBLICATIONS

Machine Translation of EP.*

Lijun Miao, "Analysis on Mechanical Inspection Technology of Elevator Cranes", Science and Technology Information, Dec. 5, 2012, p. 385, No. 34, China Academic Journal Electronic Publishing House, http://www.cnki.net.

* cited by examiner

ELEVATOR ROLLER FOR AN ELEVATOR SYSTEM, ELEVATOR SYSTEM HAVING AT LEAST ONE SUCH ELEVATOR ROLLER, AND METHOD FOR PRODUCING AN ELEVATOR ROLLER

FIELD

The invention relates to an elevator roller for an elevator system, to an elevator system having at least one such elevator roller, and to a method for producing an elevator roller.

BACKGROUND

In elevator systems, movable components such as elevator cars and counterweights are mostly held with the aid of suspension means, for example in the form of suspension belts, and are moved vertically through an elevator shaft. Elevator rollers are often attached to the movable and stationary components in a manner allowing rotation, and the suspension means run along the outer circumferential surfaces of the elevator rollers. The suspension means in this case can carry the full weight of the movable component. The suspension means runs over at least one elevator roller. The elevator roller can be referred to as a pulley. The elevator rollers may be arranged below the car, above the car or above the counterweight, and may be arranged as deflection pulleys on the elevator drive. An elevator system can have any number of elevator rollers in order to enable the desired suspension of the system. Such elevator suspension topologies are well known to those skilled in the art.

A conventional elevator roller for a suspension belt of an elevator system can have a flat running surface, or a running surface with circumferential grooves, a substantially profiled, for example cylindrical running surface, or a smooth running surface, which is delimited on opposite sides by an edge disk. The edge disks prevent the suspension belt from escaping laterally in the event of an angular error between the elevator roller and the suspension belt. The elevator roller can for example be made of metal. In order to achieve the lowest possible friction between the edge disks and the suspension belt, the contact surfaces on the side facing the belt can be specially processed—that is, for example, finely turned, ground, blasted or polished.

Elevator rollers are known from EP2684831A1 and WO2016019135A1.

SUMMARY

Among other things, there may be a need for elevator rollers which can be used to efficiently hold and guide suspension means, which are low-wear and robust, and/or which can be produced easily and/or inexpensively. Furthermore, there may be a need for an elevator system equipped with such elevator rollers, and for a method for manufacturing such elevator rollers.

Such a need can be met by the subject matter of the advantageous embodiments defined in the following description.

According to a first aspect of the invention, an elevator roller for an elevator system is presented, wherein the elevator roller has a roller body made of a metal material and a shell that forms a running surface of the elevator roller and is made of a POM material, the shell and the roller body each having an identical wave profile running along the circumference in a complementary manner on a shared contact surface, wherein the shell has, on the running surface, a V-ribbed profile aligned with the wave profile of the roller body, which has a rib spacing that substantially corresponds to a wave spacing of the wave profile.

According to a second aspect of the invention, an elevator system having at least one elevator roller according to an embodiment of the first aspect of the invention is presented, wherein a belt with a V-ribbed surface made of a PU material is guided in the circumferential direction over the running surface of the elevator roller.

According to a third aspect of the invention, a method for producing an elevator roller for an elevator system is presented, wherein a shell made of a POM material forming a running surface of the elevator roller is connected to a contact surface of a roller body made of a metal material, wherein the contact surface has a wave profile running in the circumferential direction, and wherein a V-ribbed profile of the shell running in the circumferential direction on the running surface has a rib spacing which substantially corresponds to a wave spacing of the wave profile.

Ideas for embodiments of the present invention can be considered, inter alia and without restricting the invention, as being based on the thoughts and findings described below.

To summarize briefly, it is proposed to assemble an elevator roller from at least two components. In this case, an inner roller body is provided on its outer circumference with a shell which is intended to form an outer running surface of the elevator roller. The roller body consists of a metal material, whereas the shell should consist of a plastic in the form of a POM material selected especially for this purpose, or should comprise such a POM material.

The POM material can be a polyoxymethylene material. In particular, the POM material can comprise high molecular weight polyoxymethylene. In particular, the POM material can be a POM copolymer (POM-C). Such a POM material can have a particularly low coefficient of friction when in contact with PU (polyurethane) material, for example. Furthermore, the coefficient of friction of the POM material with respect to PU material can be largely constant regardless of a surface pressure, and/or can be largely independent of the prevailing temperature and humidity. In addition, when the POM material comes into contact with PU material, little or even no electrostatic charge can occur.

The roller body can be substantially circular-cylindrical or have a circular-cylindrical circumferential surface. The metal material of which the roller body is made or with which the roller body is constructed can be steel, for example. The steel can be hardened.

The shell can be annular. The shell can directly adjoin the roller body in the radial direction. The outer circumferential surface of the shell can form the running surface of the elevator roller. The running surface can be rotationally symmetrical to an axis of rotation of the elevator roller.

The circumferential surface of the roller body forms the contact surface on which the roller body located radially further inward adjoins the shell located radially further outward.

At the contact surface, the roller body and the shell have identical wave profiles that are complementary to each other. A complementary wave profile can have a positive side and a negative side. The positive and negative sides can fit together exactly. A circumferential direction can be tangential to the axis of rotation. A wave profile can have peaks running in the circumferential direction, and valleys running in the circumferential direction between the peaks. A V-ribbed profile can have V-shaped ribs running in the circumferential direction, and V-shaped spaces between the ribs. The ribs can be aligned with the peaks. A rib spacing can describe a distance between two ribs, in particular between the centers of two ribs. The rib spacing is sometimes also referred to as the rib pitch. A wave spacing can describe a distance between two peaks or between two valleys, in particular between the centers of two peaks or valleys. The wave spacing is sometimes also referred to as the wave pitch.

With the approach presented here, good lateral guidance of the belt on the elevator roller can be achieved. If an angle error occurs between the belt and the elevator roller, the shell made of the POM material results in low friction between the belt and the POM material. Due to the low friction, ribs of the belt can slide into the spaces between the ribs of the V-ribbed profile with low frictional force. Due to the resulting low frictional force, a suspension belt, which could potentially be arranged over the running surface of the elevator roller with a slight skew, can thus be prevented, for example, from moving over time in an axial direction of the elevator roller, and ultimately slipping off the elevator roller. Instead, the suspension belt is guided by the V-ribbed profile which the shell forms on the running surface, and is prevented from being displaced in the axial direction of the elevator roller. The low friction and the resulting suppression of skew also lead to a reduction in noise.

The profiled contact surface of the roller body also results in emergency running properties even in the event that the shell is destroyed, because the belt is also guided laterally in the wave profile of the roller body. It can have an advantageous effect that the V-ribbed profile formed on the running surface of the shell has a rib spacing which corresponds to the wave spacing of the wave profile on the contact surface between the shell and the roller body. A suspension belt provided with ribs can therefore engage in the V-ribbed profile of the shell and be guided by it during normal operation. In the event that the shell is destroyed or falls away, the V-ribbed profile can, however, also work together with the wave profile on the remaining roller body and be guided by it.

The wave profile also enables an increased durability of the shell, since an approximately constant material thickness exists between the wave profile and the V-ribbed profile.

The shell can be molded onto the roller body using an injection molding process. On the contact surface of the shell with the roller body, an identical and complementary wave profile can be formed by the wave profile of the roller body. The V-ribbed profile of the running surface can be formed by an injection molding tool used in the injection molding process. The contact surface of the roller body can be a boundary surface of a mold cavity of the injection molding tool. A plasticized POM material can mold itself to the positive wave profile of the roller body as a negative wave profile of the shell, and the positive V-ribbed profile in the injection molding tool can mold the negative V-ribbed profile of the shell.

The shell can have a material thickness between 1 mm and 5 mm in the region of the running surface. In particular, the material thickness of the shell can be between 0.1% and 10%, preferably between 1% and 5%, of a diameter of the elevator roller. The shell is therefore not a thin coating of the roller body, but is a component of substantial thickness, and is therefore resistant to abrasion. The shell is a load-bearing component of the elevator roller.

The material thickness can vary at different positions along a longitudinal direction of the shell by less than 30%, preferably by less than 20% and more preferably by less than 10%. The material thickness can thus be substantially uniform along the axial length of the running surface of the shell. Accumulations of material are avoided. The uniform material thickness results in uniform thermal shrinkage of the POM material when it cools. In this way, both the manufacture of the elevator roller can be simplified and/or can be more reliable, and also properties of the shell can be improved with regard to, for example, a load-bearing capacity or its wear.

The POM material can have a material coefficient of friction against a PU material between 0.1 and 0.6. Due to the low material coefficient of friction, only a small proportion of the resulting normal force between the belt and the running surface acts as friction. Low friction leads to low abrasion and low warming of the partners involved. In addition, the profiled belt is prevented from rising onto the complementary profiled running surface of the elevator roller, for example in the event of a slightly skewed belt, and thus a tendency of the skewed belt to slide off the elevator roller in the axial direction can be reduced.

In the roller body, peak radii of the peaks can be smaller than valley radii of the valleys. In other words, the wave profile at the contact surface between the roller body and the shell can be more tightly curved in the region of the peaks than in the region of the valleys. A stress-increasing notch effect can be reduced by large valley radii. In particular, in the case of a hardened material of the roller body, the larger valley radii can prevent the formation of cracks.

An extrusion surface of the POM material can be untreated, at least in the region of the running surface. The extrusion surface can be understood to mean an exposed surface of the POM material, as is typically formed by an extrusion process, in particular an injection molding process used to form the shell. An extrusion surface can be particularly smooth because, on the one hand, the mold cavity of the injection molding tool can be polished and, on the other hand, a smooth surface results due to the curing process of the plastic melt on the tool. The extrusion surface can be pore-free. The elevator roller can be used in the form in which it is removed from the injection molding tool. The extrusion surface can have a low coefficient of friction.

The shell can have at least one edge disk made of the POM material and laterally adjoining the running surface. The edge disk can be manufactured in an injection molding process. In particular, the edge disk can be produced together with the rest of the shell in the same injection molding process. The running surface and the edge disk can thus be made of a single piece. The edge disk can be used as a safety element to prevent the belt from escaping laterally.

At least one edge disk of the shell can be molded onto the roller body with an outward inclination. The outward inclination can be compensated for after removal from the injection molding tool by thermal shrinkage of the shell during a cooling phase. An extrusion surface of the POM material, at least in the region of an inside of the edge disk facing the running surface, can be unprocessed. Due to the mutual compensation of the forward inclination and the shrinkage, post-processing can be omitted.

An outer ring of a bearing of the elevator roller can form the roller body. The outer ring can have the wave profile. A bearing can have an inner ring and an outer ring. Rolling elements of a roller bearing can be arranged between the inner ring and the outer ring. The roller bodies can be, for example, balls, cylinders, or rollers or needles. If the outer ring is used as a roller body, a large bearing can be used. The outer ring can have a greater wall thickness than in the case of a standard bearing. The outer ring can be machined, for example, by turning. The result is a two-part construction of the elevator roller, the first part being formed by the roller bearing and the second part being formed by the shell.

Alternatively, the roller body can have a fitting surface to an outer ring of a bearing of the elevator roller on a side opposite the contact surface. The bearing can be pressed into the roller body. The roller body can be substantially hollow-cylindrical. The bearing can be secured against lateral movement. In the case of a large elevator roller, there can be enough space between the running surface and the bearing to use a roller body that is easy to manufacture. The result is a three-part structure of the elevator roller, the first part being formed by the roller bearing, the second part being formed by the outer ring, which is also referred to as a mantle, and the third part being formed by the shell.

The bearing can be a sealed, double row cage ball bearing in an O arrangement. A sealed bearing can have two seals. The seals can close off a gap between the outer ring and the inner ring on both sides. A sealed bearing can be protected from dirt. The sealed bearing can be filled with a lubricant. The lubricant can be enclosed in the gap by the seals. A double-row roller bearing can have two rows of roller bodies rolling one behind the other. The double row roller bearing can support an axial force in addition to a radial force. A cage roller bearing has a cage for the roller bodies. The cage is arranged in the gap between the inner ring and the outer ring. The cage has regularly arranged recesses for the roller bodies. A ball bearing has balls as roller bodies. An O-arrangement enables a two-row roller bearing to support an axial force, and thus an increased torque. The bearing can have a special play of the bearing. A play of the bearing can occur when the bearing is not stressed. When the bearing is installed, the play of the bearing is reduced. When the shell is applied to the contact surface, the play of the bearing is reduced. A supported radial force reduces the play of the bearing on one side, but it increases it on an opposite side. The play of the bearing can be matched to the expected radial force.

It should be understood that some of the possible features and advantages of the invention are described herein with reference to different embodiments. A person skilled in the art recognizes that the features of the elevator roller, the elevator system, and the method for producing the elevator roller can be combined, adapted or substituted as appropriate in order to arrive at further embodiments of the invention.

Embodiments of the invention will be described in the following with reference to the accompanying drawings, wherein neither the drawings nor the description are intended to be interpreted as limiting to the invention.

Figure 1:
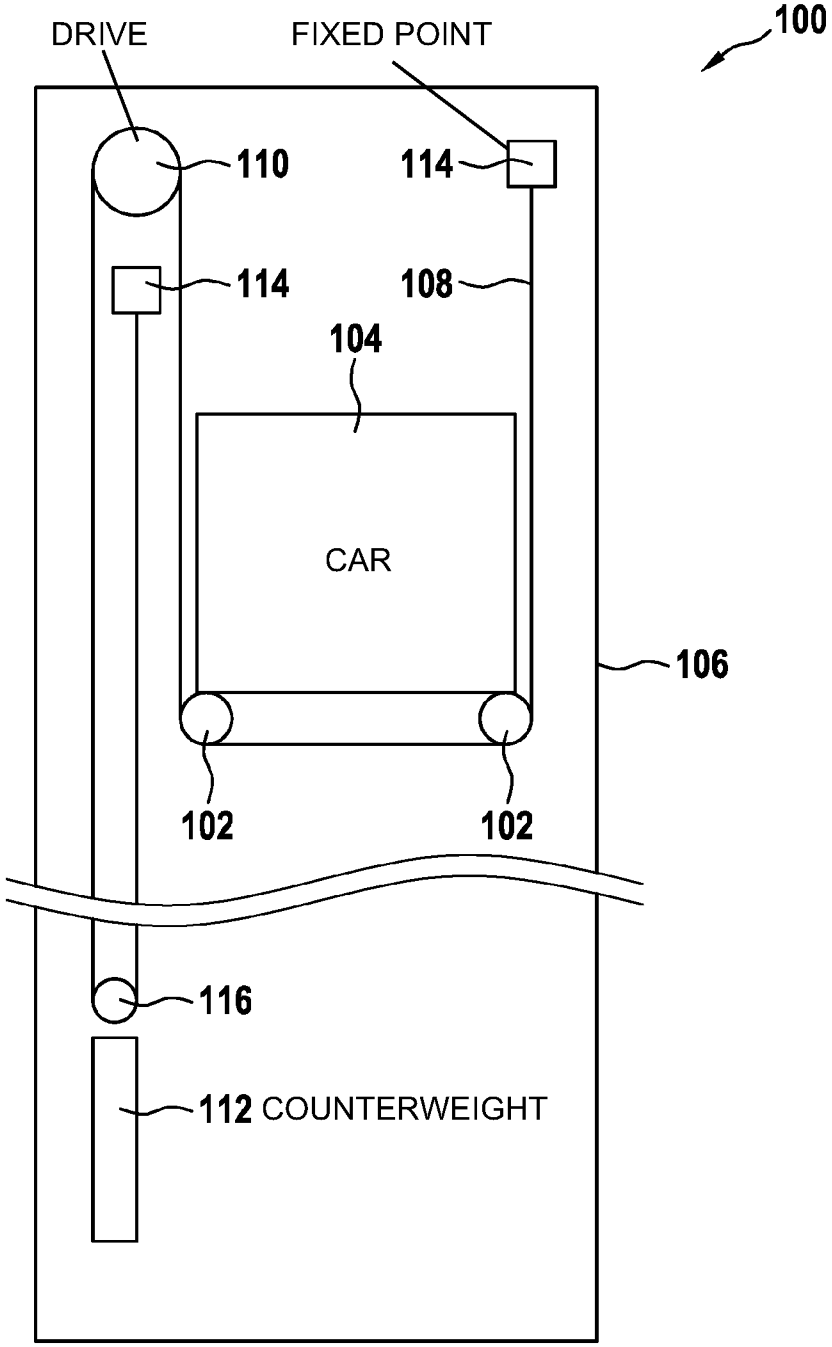
FIG. 1 shows an illustration of an elevator system having at least one elevator roller according to an embodiment.

The drawings are merely schematic and not to scale. Like reference signs refer to like or equivalent features in the drawings.

DETAILED DESCRIPTION

FIG. 1 is an illustration of an elevator system 100 having at least two elevator rollers 102 according to an embodiment of the invention. The elevator rollers 102 can be referred to as pulleys of the elevator system 100. The elevator system 100 has a car 104 which is suspended in an elevator shaft 106 on one or more belts 108 so that it can move vertically. Guide rails for guiding the car 104 in the elevator shaft 106 are not shown here for the sake of simplicity.

The elevator rollers 102 are arranged in the region of a base of the car 104, and the belt 108 runs over the elevator rollers 102. The belt 108 connects the car 104 to a drive 110 of the elevator system 100 and to a counterweight 112 of the elevator system 100. The belt 108 is fastened at each end to a fixed point 114 of the elevator shaft 106. The fixed points 114 are arranged in an upper end region of the elevator shaft 106.

The belt 108 runs vertically downward from one of the fixed points 114 on one side of the car 104 to one of the elevator rollers 102. The elevator roller 102 is arranged in a lateral lower corner region of the car 104. Over the elevator roller 102, the belt 108 is deflected to the horizontal and runs horizontally under the car 104 through to the other elevator roller 102. The other elevator roller 102 is arranged in an opposite lateral lower corner region of the car 104. Over the other elevator roller 102, the belt 108 is deflected back to the vertical, and runs vertically on the other side of the car 104 upward to a drive roller of the drive 110. The belt 108 is deflected by 180° over the drive roller and runs vertically downward to a deflection roller 116 connected to the counterweight 112. Over the deflection roller 116, the belt 108 is deflected again by 180°, and again runs vertically upward to the other fixed point 114.

The belt 108 in this case is a V-ribbed belt with at least one V-ribbed surface. Therefore, at least the elevator rollers 102 have a V-ribbed profile on a running surface. Due to the V-ribbed surface engaging in the V-ribbed profile, the belt 108 is guided laterally in the elevator rollers 102—that is, in an axial direction of the elevator rollers 102 and thus transversely to a longitudinal direction of the V-ribbed profile. The elevator rollers 102 have edge disks as an additional lateral guide.

Figure 2A:
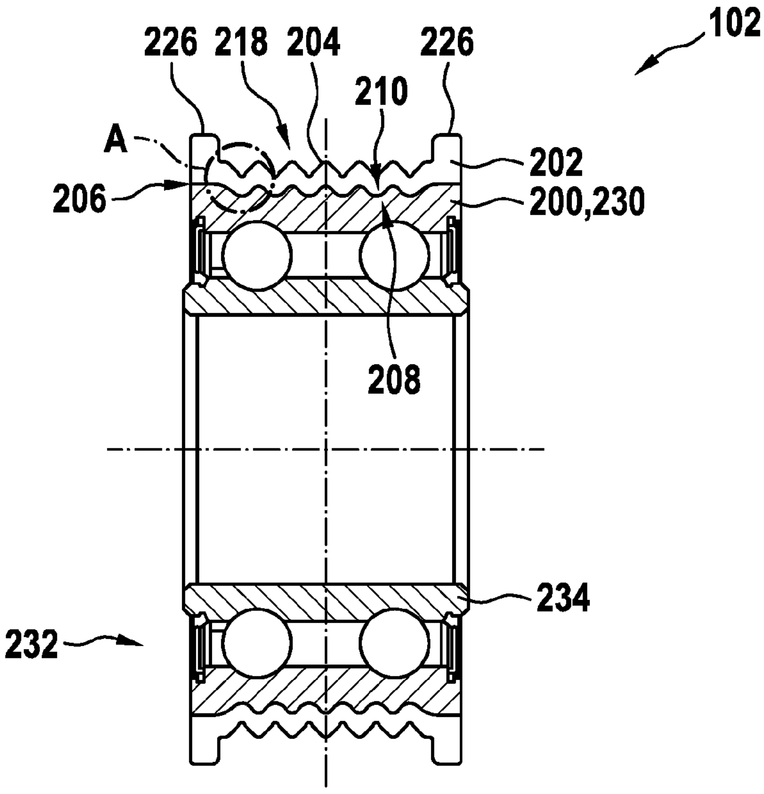
FIG. 2*a* shows a cutaway illustration of an elevator roller according to an embodiment.
Figure 2B:
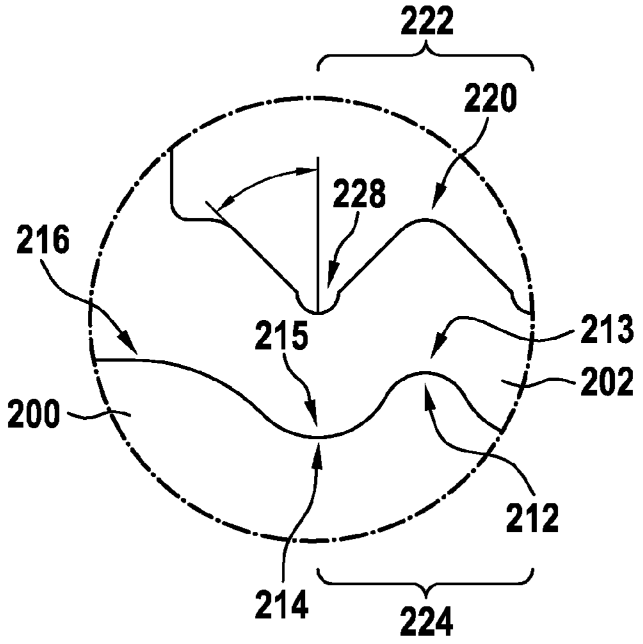
FIG. 2*b* shows a detailed illustration of a V-ribbed profile of an elevator roller, aligned with a wave profile, according to an embodiment illustrated in detail A of FIG. 2*a*.

FIGS. 2*a* and 2*b* show a cutaway view of an elevator roller 102 according to an embodiment. FIG. 2*a* shows a cutaway view of the entire elevator roller. FIG. 2*b* shows an enlarged illustration of the detail A of the cutaway illustration in FIG. 2*a*. The elevator roller 102 corresponds substantially to one of the elevator rollers in FIG. 1. The elevator roller 102 is shown cut in the middle along an axis of rotation.

The elevator roller 102 has a roller body 200 and a shell 202. The shell 202 forms a running surface 204 of the elevator roller 102. The roller body 200 consists of a metal material, in particular steel. The shell 202 is made of a POM material. A polyoxymethylene material is what is referred to as a POM material. A contact surface 206 between the shell 202 and the roller body 200 has a wave profile in some regions in a circumferential direction of the elevator roller 102. The roller body 200 thus has a positive wave profile 208, while the shell 202 has an identical and complementary negative wave profile 210.

In one embodiment, the POM material is referred to as PAS-L material, in particular PAS-L69. Such a POM material is produced by Faigle (based in Hard, Austria). Information on this POM material is available at www.faigle-.com, in particular at www.faigle.com/presse/die-pas-l-materialfamilie/. A density of such POM material can be about 1.41 g/cm$^3$. A maximum permissible compressive load (permanent) can be 16 N/mm$^2$ (static). The pv value, i.e. the product of the specific pressure (p) and the surface velocity (v), determines the usability of the material. Both influencing factors interact with each other. Depending on the surface speed, the value during dry running against steel can be between 0.1 and 0.15. A dynamic coefficient of friction is, for example, 0.3, this value being an average value for dry running on steel.

The POM material is injection molded onto the roller body 200 to produce the elevator roller 102. For this purpose, the roller body 200 is arranged in a receptacle of an injection molding tool for producing the shell 202. By closing the injection molding tool, a mold cavity for the shell 202 is formed. The POM material is injected into the mold cavity in plasticized form, acquires its shape, and bonds with the contact surface 206. The plasticized POM material can be injected into the mold cavity through at least three evenly distributed sprues. Alternatively, the POM material can be injected into the mold cavity via an annular diaphragm gate. After the mold cavity has been completely filled, the POM material cools below a plasticizing temperature and solidifies in the mold cavity. After solidification, the injection molding tool is opened and the elevator roller 102 is removed. The POM material continues to cool down after being removed and thus achieves its desired properties.

The positive wave profile 208 of the roller body 200 has peaks 212 and valleys 214. The peaks 212 of the positive wave profile 208 have a smaller peak radius than a valley radius of the valleys 214 of the positive wave profile 208. Peak radii and valley radii transition directly into each other. Correspondingly, the complementary negative wave profile 210 of the shell 202 also has peaks 215 and valleys 213, the peaks 215 of the negative wave profile 210 each having a peak radius corresponding to the valley radius of the positive wave profile 208, and the valleys 213 of the negative wave profile 210 each having a peak radius corresponding to the valley radius of the positive wave profile 208. The peaks 215 of the negative wave profile 210 therefore have a greater peak radius than the valley radius of the valleys 213 of the negative wave profile 210.

The positive wave profile 208 of the roller body 200 has six valleys 214 and five peaks 212 in this case. The outer valleys 214 each terminate in an unprofiled shoulder region 216 of the roller body 200.

The shell 202 has a V-ribbed profile 218 on the running surface 204. The V-ribbed profile 218 has five ribs 220. The ribs 220 are aligned in the radial direction with the peaks 212 of the positive wave profile 208 of the roller body 200. A rib spacing 222 between two ribs 220 of the V-ribbed profile 218 is, within a processing tolerance, equal to a wave spacing 224 between two peaks 212 of the wave profile 208. The V-ribbed profile 218 provides a lateral guide for the belt, which is accordingly configured with V-ribs.

In one embodiment, the wave spacing 224 and the rib spacing 222 are five millimeters. However, the spacing between the ribs can also be larger or smaller. For example, the rib spacing can be in a range from 1 mm to 20 mm.

Due to the alignment of the V-ribbed profile 218 with the positive wave profile 208, the shell 202 has a substantially constant material thickness in the cutaway plane shown.

In one embodiment, the elevator roller 102 has edge disks 226. The edge disks 226 laterally delimit the running surface 204 in order to reliably prevent the belt from escaping laterally. The peripheral disks 226 terminate in a narrow shoulder. The V-ribbed profile 218 adjoins the shoulder.

In order to make post-processing of the edge disks 226 unnecessary, the edge disks are correspondingly injected with a forward inclination during the injection molding process—that is, for example, they are injection molded with an outward inclination. The thermal shrinkage of the POM material from a solidification temperature to room temperature compensates for the inclination when it cools. The forward inclination is incorporated into the injection molding tool.

In one embodiment, the flanks of the ribs 220 have an angle of 45°. A rib head of the ribs 220 is rounded, with a radius of 0.9 millimeters. At the rib head, the shell 202 has a material thickness of 3.5 millimeters. A rounded groove 228 is arranged at a rib base of the ribs 220. The groove 228 is rounded with radii of 0.5 millimeters.

In one embodiment, the peaks 212 of the positive wave profile 208 have a radius of one millimeter. The valleys 214 of the positive wave profile 208 have a radius of 1.85 millimeters.

In one embodiment (see FIG. 2*a*), an outer ring 230 of a bearing 232 of the elevator roller forms the roller body 200. The positive wave profile 208 is formed directly in the outer ring 230. This embodiment corresponds to a two-part embodiment. The bearing 232 with the outer ring 230 forms the first part. The shell 202 forms the second part.

As an alternative to this, in one embodiment the roller body 200 has an inner cylindrical recess into which one or more bearings 232 of the elevator roller 102 are pressed.

In one embodiment, the bearing 232 is a roller bearing. In this case, the bearing 232 is configured as a two-row ball bearing in an O arrangement. A gap between the outer ring 230 and an inner ring 234 of the bearing 232 is sealed off.

Figure 3:
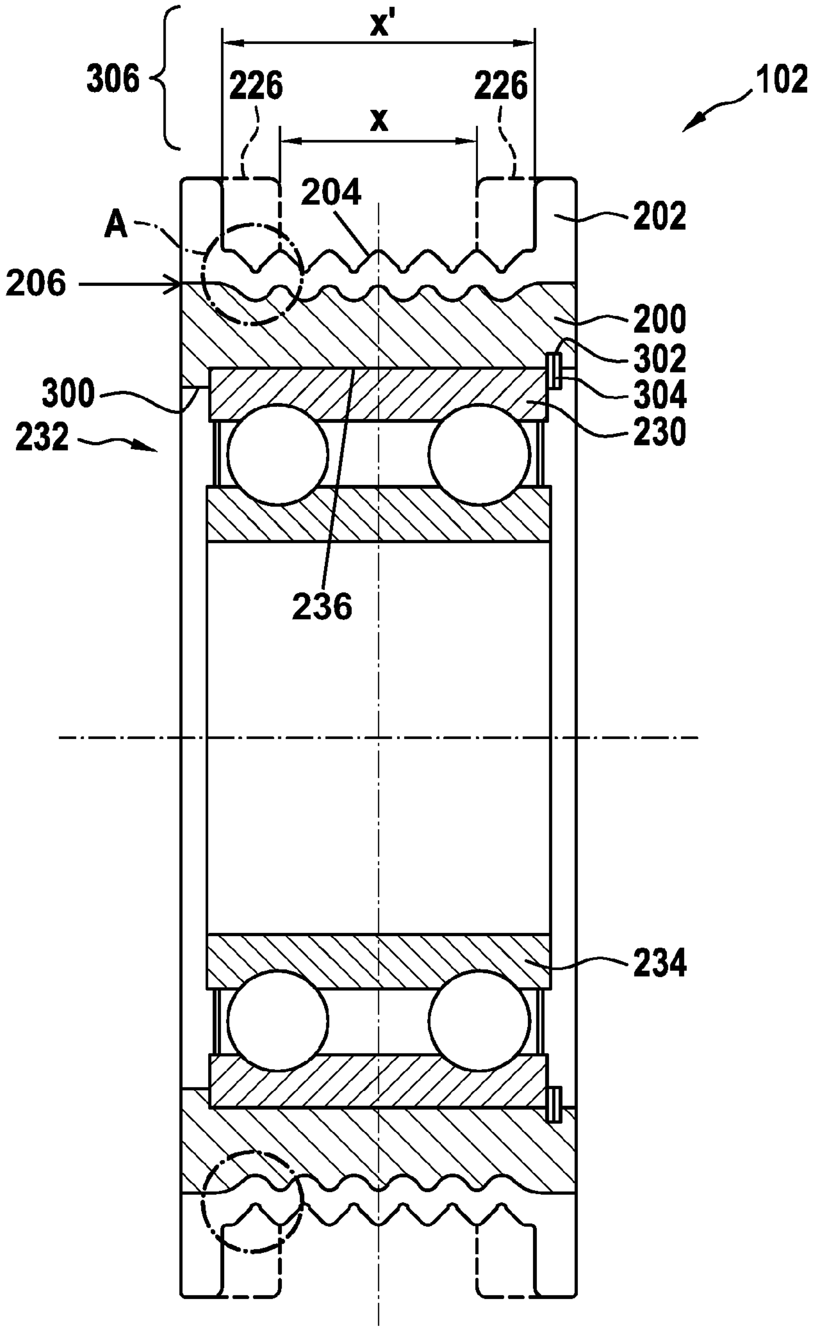
FIG. 3 shows a cutaway illustration of a multi-part elevator roller according to an embodiment.

FIG. 3 shows a cutaway illustration of a multi-part elevator roller 102 according to an embodiment. The elevator roller 102 corresponds substantially to the elevator roller illustrated in FIG. 2*a*. The shell 202 and the roller body 200 are permanently fixed to each other, as in FIG. 2*a*. In contrast to the illustration in FIG. 2*a*, the elevator roller 102 shown in FIG. 3 has a larger diameter in this case. As a result, the roller body 200 has a sufficient wall thickness to allow pressing a conventional bearing 232 into it. For this purpose, the roller body 200 has an internal, substantially cylindrical recess into which one or more bearings 232 of the elevator roller 102 are pressed with the outer ring 230 being received against a fitting surface 236 opposite the contact surface 206.

The outer ring 230 of the bearing 232 adjoins the roller body 200 directly via a press fit. This embodiment of the elevator roller 102 corresponds to a three-part embodiment. The bearing 232 with the outer ring 230 forms the first part. In contrast to the two-part embodiment, the three-part embodiment also has a separate roller body 200 that is not embodied on the outer ring 230 of the bearing 232. In this embodiment, the roller body 200 is configured as a type of mantle. The shell 202 forms the third part. In one embodiment, the outer ring 230 of the bearing 232 is additionally fixed in the axial direction by a collar 300 running around the recess in the circumferential direction, and a snap ring 304 inserted in a groove 302 running around the recess in the circumferential direction.

In one embodiment, the running surface 204 has a smaller width x than in FIG. 2*a*. The V-ribbed profile 218 has the same rib spacing as in FIG. 2*a*. Therefore, the elevator roller in this embodiment has only three ribs. The roller body 200, however, has the same width as in FIG. 2*a*. The edge disks 226 are therefore wider than implemented in FIG. 2*a* in order to compensate for the difference in width between the running surface 204 and the roller body 200. However, as in FIG. 2*a*, the positive wave profile 208 of the roller body 200 has five peaks and substantially the same wave spacing. The two outermost valleys of the positive wave profile 208 therefore lie outside the running surface 204. The width x can be varied to x' within a variance 306 by adapting the injection molding tool.

Finally, possible configurations of the elevator roller proposed here are explained again with a slightly different choice of words.

A pulley with a plastic coating is presented. High molecular polyoxymethylene (POM) is used for the coating. In combination with a belt made of polyurethane (PU) material, the material coefficient of friction is between 0.1 and 0.6. The material coefficient of friction with respect to PU material is substantially independent of the contact pressure, temperature and humidity. The contact pressure with respect to PU material of the belt is 0.8 $N/mm^2$ to 5.0 $N/mm^2$; the coating can be used at temperatures between 5-40° C., and even at temperatures between −5 to 60° C., without any problems. The humidity can be up to 95% RH. There is little or no electrostatic charge with PU material. The POM material has high ductility down to −40° C., and excellent wear resistance. Furthermore, the POM material has good running properties, high impact resistance, and strength over a wide temperature range. The ductility results in resistance to repeated impact loads. The POM material has very good temperature resistance and exceptional dimensional stability. Furthermore, the POM material has long-term creep resistance and high flexural fatigue strength. The POM material also has excellent resistance to moisture, chemicals and fuels. The POM material can be processed by injection molding and extrusion and is suitable for 2K injection molding.

Two or more pulleys with different diameters (between D85 mm and D147 mm), for example D95, D105, D110, D125, can be produced. With the larger pulleys, a three-part structure consisting of a steel ring with a plastics material running surface and a bearing is used to achieve the diameter. This means that the same roller bearing can also be used for the larger pulleys. The same roller bearing can be used for different belt widths; only the plastics material external geometry is varied for this. This has the advantage that the variance in the roller bearings is not present, or is at least very small—that is to say that the same roller bearing can be used with a plurality of pulley diameters. In this way, the number of roller bearing types can be kept small, and the expenses for retooling in the production process, and the space requirements and costs for storage can be significantly reduced. During injection molding, pressures of up to 600 bar can occur. Due to the high pressure and the high temperature, the roller body is stressed during the production process (for example, the play of the bearing is narrowed). Before the overmolding, the ball bearing can have an increased play of the bearing, which is matched to the compression during overmolding. The ball bearing can have an optimized play of the bearing after overmolding.

The roller body has rounded V-grooves, which results in an improved notch effect in the notch base.

In the manufacturing process presented, the shrinkage behavior of the POM material is included in the shape design. For example, the side flanges are inclined further outward in order to compensate for the change that occurs during shrinkage. This has the advantage that no mechanical post-processing is necessary, which simplifies production and maintains the advantageous extrusion surface of the coating.

The V-rib profile aligned with the wave profile results in a substantially uniform material thickness of the plastic running surface. The wave profile results in a profiled connection between the roller body or the bearing and the plastic running surface.

During production, at least three injection points or, alternatively, a diaphragm gate, are used for the injection to ensure even concentricity. In the case of small diameters, the bearing can be overmolded when it is fully assembled. With larger diameters, the bearing can be pressed into the roller body functioning as a mantle. The roller body can be coated prior to injection molding to improve the plastics material bonding.

Finally, it should be noted that terms such as "comprising," "having," etc. do not preclude other elements or steps, and terms such as "a" or "an" do not preclude a plurality.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator roller for an elevator system, the elevator roller comprising:

a roller body made of a metal material;

a shell made of a POM material and forming a running surface ending in a circumferential direction about an outer surface of the elevator roller;

wherein the shell and the roller body each have a wave profile running in the circumferential direction on a shared contact surface; and wherein the shell has, on the running surface, a V-ribbed profile aligned with the wave profile of the roller body, the V-ribbed profile having a rib spacing that corresponds to a wave spacing of the wave profile of the roller body, where a groove between each rib of the V-ribbed profile of the shell aligns radially with a valley of the wave profile of the roller body, where the groove and the valley each correspond with a location of locally minimum radius from an axis of rotation of the elevator roller.

2. The elevator roller according to claim 1 wherein the shell has a material thickness between 1 mm and 5 mm in a region of the running surface.

3. The elevator roller according to claim 2 wherein the material thickness varies by less than 30% at different positions along a longitudinal direction of the shell.

4. The elevator roller according to claim 1 wherein the POM material has a material coefficient of friction between 0.1 and 0.6 with respect to a PU material of an elevator suspension belt engaging the running surface.

5. The elevator roller according to claim 1 wherein the wave profile of the roller body has peaks running in the circumferential direction and valleys running in the circumferential direction between the peaks, wherein peak radii of the peaks are smaller than valley radii of the valleys.

6. The elevator roller according to claim 1 wherein an extrusion surface of the POM material shell is not processed after forming the shell at least in a region of the running surface.

7. The elevator roller according to claim 1 wherein the shell has at least one edge disk made of the POM material and laterally adjoining the running surface, wherein the at least one edge disk extending transverse to the circumferential direction beyond the running surface.

8. The elevator roller according to claim 7 wherein an extrusion surface of the POM material shell is not machined after forming the shell at least in a region of an inside surface of the edge disk facing the running surface.

9. The elevator roller according to claim 1 wherein an outer ring of a bearing forms the roller body, the outer ring having the wave profile of the roller body.

10. The elevator roller according to claim 9 wherein the bearing is a sealed, double-row ball bearing in an O arrangement.

11. The elevator roller according to claim 1 including a bearing and wherein the roller body has a fitting surface receiving an outer ring of the bearing on a side opposite the contact surface.

12. The elevator roller according to claim 11 wherein the bearing is a sealed, double-row ball bearing in an O arrangement.

13. An elevator system comprising:

at least one elevator roller according to claim 1; and a belt having a V-ribbed surface made of a PU material guided in the circumferential direction over the running surface of the at least one elevator roller.

14. A method for manufacturing an elevator roller for an elevator system, the method comprising the steps of:

forming a shell of a POM material with a running surface;

connecting the shell to a roller body made of a metal material at a common contact surface to form the elevator roller;

wherein the contact surface has a wave profile running in a circumferential direction of the elevator roller; and wherein the shell has a V-ribbed profile running in the circumferential direction on the running surface, the V-ribbed profile having ribs at a rib spacing corresponding to a wave spacing of the wave profile, where a groove between each rib of the V-ribbed profile of the shell aligns radially with a valley of the wave profile of the roller body, where the groove and the valley each correspond with a location of locally minimum radius from an axis of rotation of the elevator roller.

15. The method according to claim 14 wherein the step of connecting includes injection molding the shell onto the roller body using an injection molding process, wherein the contact surface wave profile includes a wave profile of the shell that is complementary to a wave profile of the roller body, and including forming the V-ribbed profile of the running surface an injection molding tool used in the injection molding process.

16. The method according to claim 15 including injection molding at least one edge disk of the shell onto the roller body with an outward inclination, wherein the inclination is compensated during a cooling phase after removal of the elevator roller from the injection molding tool due to thermal shrinkage of the shell.

* * * * *